Aug. 20, 1968  H. J. DONALD  3,397,428
APPARATUS FOR THE PREPARATION OF THEMOPLASTIC
RESINOUS COMPOSITE ARTICLES
Filed Aug. 14, 1964

INVENTOR.
Harold Jack Donald
BY
Robert B Ingraham
AGENT
Jerome Rudex
ATTORNEY

United States Patent Office 3,397,428
Patented Aug. 20, 1968

3,397,428
APPARATUS FOR THE PREPARATION OF THERMOPLASTIC RESINOUS COMPOSITE ARTICLES
Harold Jack Donald, Midland, Mich., assignor to The Dow Chemical Company, Midland, Mich., a corporation of Delaware
Filed Aug. 14, 1964, Ser. No. 389,732
4 Claims. (Cl. 18—13)

ABSTRACT OF THE DISCLOSURE

Multilayer film or sheet is prepared by providing a heat plastified stream of at least two components generally concentrically arranged, to a sheeting die having a restrictor bar supported within the cavity, the bar being generally parallel and spaced from the extrusion slot.

---

This invention relates to the preparation of composite thermoplastic sheets. It more particularly relates to apparatus for the extrusion lamination of such articles.

Oftentimes it is desirable to prepare synthetic resinous film and sheet wherein a plurality of components are arranged in laminar fashion to provide desired characteristics. Many methods and techniques have been used including the preparation of individual films or sheets and lamination by means of adhesives or by utilizing one of the layers as a melt adhesive. In general such techniques are generally time consuming and expensive and do not offer the choice of varying thickness of the various layers of the laminates without difficulty. For example, where various layers are prepared by means of adhering two or more sheets together, sheets must be obtained of the desired thickness and subsequently laminated.

In certain instances laminated sheets are prepared by extruding two or more separate layers and combining within a die. This technique usually involves a generally coaxial construction which may be referred to as a die-within-a-die wherein two coplanar slots are utilized, one of the slots being an extrusion slot of a die disposed within another die. Such a configuration results in a three layer film wherein the outer layers are of like material and the inner layer originates from the inner die. Such an arrangement is generally expensive and not readily prepared from conventional slot of sheeting dies without extensive modificatiion.

It is an object of this invention to provide a versatile and simple apparatus for the preparation of laminated thermoplastic resinous materials.

It is an object of this invention to provide an improved simplified apparatus for the preparation of laminated film and sheeting.

A further object of the invention is to provide apparatus for the preparation of laminates in substantially a single operation.

A further object of the invention is to provide apparatus which permits ready control of the thickness of the various layers of the laminate.

These features and other advantages in accordance with the present invention are achieved in a process for the extrusion of a thermoplastic resinous sheet or film wherein a heat plastified thermoplastic resinous material is extruded as a sheet and cooled below its thermoplastic temperature, the improvement which comprises providing to a sheeting die a stream of thermoplastic resinous material, the stream comprising an inner portion and an outer portion generally concentrically arranged, passing the stream into a configuration adapted to form the stream into a sheet-like configuration, restraining the flow of the thermoplastic resinous materials within at least a central portion of the configuration in a direction generally parallel to the transverse direction of the sheet to cause a generally even distribution of the inner portion of thermoplastic resinous material between generally uniform layers of the outer portion of the sheet.

The method employed with the present invention is readily practiced utilizing a sheet or slot extrusion die having an internal passage adapted to receive concentric streams of heat plastified thermoplastic resinous material, a pair of spaced apart die lips so constructed and arranged as to form an elongated extrusion slot or orifice, the extrusion slot or orifice being in communication with the internal passage, a flow restricting means disposed within the internal passage extending longitudinally within the passage in the direction of the extrusion slot, and being spaced from the walls of the internal passageway, the flow restrictor being so constructed and arranged so as to distribute concentric streams of thermoplastic resinous material entering the passageway in a generally uniform manner along at least a major portion of the length of the extrusion slot.

Further features and advantages of the present invention will become more apparent when the following specification is taken in connection with the drawing wherein.

bit holders for use with conventional socket membres.

Figure 1:
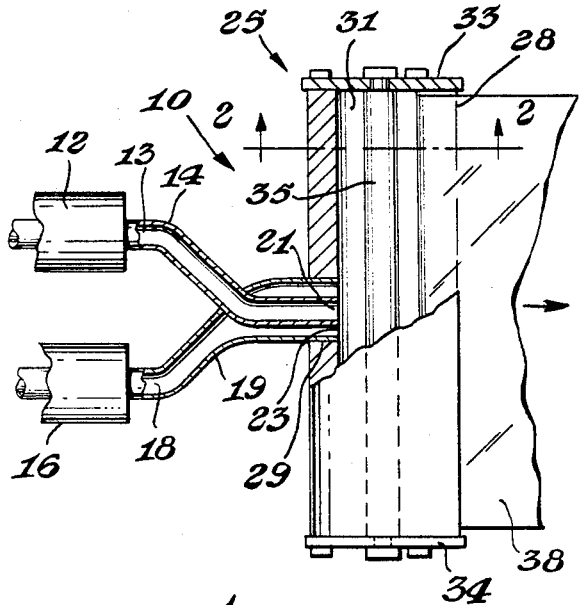
FIGURE 1 is a cutaway schematic representation of a device in accordance with an apparatus in accordance with the present invention.

In FIGURE 1 there is illustrated a cutaway schematic representation of an apparatus generally designated by the reference numeral 10. The apparatus 10 comprises in cooperative combination a first extruder 12 adapted to deliver a stream of thermoplastic resinous material 13 to a conduit 14, a second extruder 16 adapted to deliver a thermoplastic resinous stream 18 to a conduit 19. The conduit 14 has a discharge opening 21 remotely disposed from the extruder 12 and the conduit 19 has a discharge opening 23 remotely disposed from the extruder 16. The conduits 14 and 16 are so constructed and arranged so that the discharge openings 21 and 23 are adapted to discharge a generally coaxial composite stream of thermoplastic resinous material comprising an annular stream formed from the stream 18 and a centrally disposed stream 13. The terminal portions of the conduits 14 and 19 discharge into a die generally designated by the reference numeral 25. The die 25 comprises an elongated die body 27 defining an extrusion slot or orifice 28, an entrance passageway 29 in operative communication with the conduit 18 which delivers a coaxially arranged stream of heat plastified thermoplastic resinous material to a cavity 31 defined by the die bodies 27. The entrance passageway 29 is remotely disposed from the extrusion orifice 28. The elongated cavity 31 is terminated at either end by end caps or plates 33 and 34. Disposed within the cavity 31 is a flow restrictor 35 supported by the end plates 33 and 34 and in spaced relationship to the walls of the housing 27 defining the cavity 31. A composite sheet 38 is shown emerging from the extrusion orifice 28.

Figure 2:
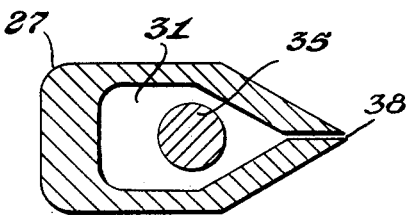
FIGURE 2 is a section of a die of FIGURE 1 taken along the line 2—2.

In FIGURE 2 there is illustrated a cross section of the die 27 taken along the line 2—2 illustrating the internal configuration of the cavity 31, the flow restrictor 35 and the extrusion orifice 38 which illustrates the spaced relationship of the flow restrictor 35 from the walls of the housing 27 defining the cavity 31.

Figure 3:
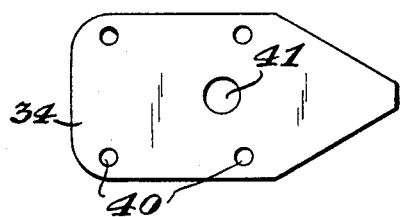
FIGURE 3 depicts a side view of an end plate of the device of FIGURE 1.

FIGURE 3 depicts an end view of an end plate such as the plate 34 having therein mounting or bolt holes 40 for attachment to the die body 27 and an opening 41 adapted to receive a bolt to support the flow restrictor 35. Beneficially the plate 34 is somewhat larger than the cross section of the die body 27 and the mounting holes 40 and the openings 41 are made larger than the bodies of the bolts which they receive thereby permitting the flow restrictor 35 to be selectively positioned within the cavity 31. The flow restrictor 35 of the embodiment of FIGURES 1 and 2 is generally cylindrical in nature.

Figure 4:
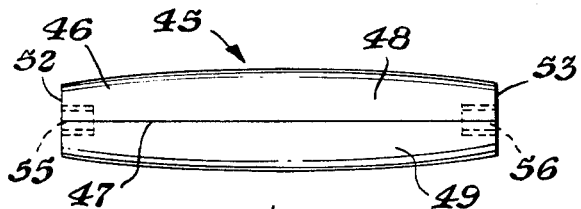
FIGURE 4 is a view of an alternate form of flow restrictor.
Figure 5:
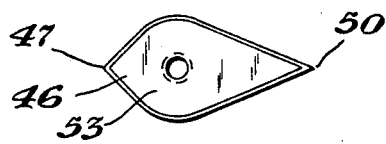
FIGURE 5 is an end view of the flow restrictor of FIGURE 4.

However, in certain instances it is desirable to employ a noncylindrical flow restrictor such as that illustrated in FIGURES 4 and 5. The flow restrictor of FIGURES 4 and 5 generally designated by the reference numeral 45 comprises a body 46 having a leading edge 47 adapted to initially engage the coaxial stream issuing from the passageway such as the passageway 29. The flow restrictor 45 has two curved surfaces of a generally similar nature 48 and 49 which diverge from each other adjacent the leading edge 47 and terminate at a trailing edge 50 remotely disposed from the leading edge 47. The body 46 is so constructed and arranged so that the opposed surfaces 48 and 49 remote from the leading and trailing edges are spaced at a greater distance in the central region than at the ends 52 and 53 of the body 46. Oppositely disposed threaded apertures 55 and 56 are provided in the ends 52 and 53 respectively in order to facilitate the mounting or positioning of the flow restrictor within the cavity such as the cavity 31 of the embodiment of FIGURES 1 and 2. In combination with a die housing such as the housing 27, the flow restrictor 45 serves to provide a pair of selectively restricted internal passageways providing communication between the extrusion orifice 38 and the inlet passageway 29.

Figure 6:
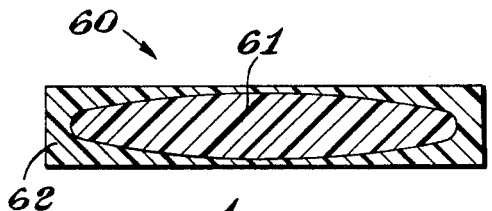
FIGURE 6 is a schematic representation of the distribution of thermoplastic resinous materials issuing from a die such as that of FIGURE 2 when the flow restrictor is removed.
Figure 7:
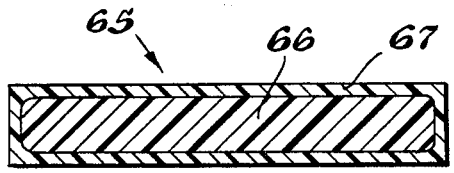
FIGURE 7 is a schematic representation of the distribution of the thermoplastic resinous material when utilizing an extrusion die having a flow restrictor therein.

In FIGURE 6 there is illustrated a schematic representation of a film or sheet 60 wherein the width has been reduced and the thickness increased for the convenience of illustration. The sheet 60 comprises a first thermoplastic resinous material 61 encapsulated within a second thermoplastic resinous material 62. Although the sheet 60 has a generally rectangular configuration the portion 61 has a generally elliptical configuration of the inner layer from the generally rectangular configuration of FIGURE 7.

In operation of the apparatus of the present invention, multilayer sheets are readily prepared from any extrudable thermoplastic resinous material. Particularly advantageous are those materials which comprise tarnsparent polymers or which may be extruded into thin transparent films. The resultant products are readily adapted to a wide variety of uses as the surface characteristics of the film are generally determined by the thermoplastic material utilized to form the surface of the product and the physical characteristics by the inner or encapsulated polymeric material such as the layers 61 and 66 of FIGURES 6 and 7, respectively. Thus, for example, the apparatus of the present invention is particularly suited for the preparation of composite films wherein polypropylene is encapsulated or laminated between two layers of polyethylene. The heat sealing characteristics of the polyethylene are admirably suited for such applications as bread overwraps, while the polypropylene in the center layer provides stiffness and rigidity lacking in the polyethylene. Further the optical characteristics of such combined films are beneficially improved and increased clarity is obtained.

For example, utilizing an apparatus generally as illustrated in FIGURE 1, a 1 mil composite film is readily prepared by extruding from extruder 12 a stream of linear polypropylene at a rate of about 40 pounds per hour. The extruder 16 provides a stream of polyethylene at a rate of about 30 pounds per hour. The resultant film had a thickness of 0.80 mil and had a relatively uniform distribution of the polypropylene with the polyethylene. The extrusion conditions for the outer layer, that is, temperature rate and the like, is substantially that of the polymer alone. However, the encapsulated layer exhibits wider tolerance in temperature than when extruded alone. The generally cylindrical spreader bar or flow restrictor 35 of the embodiment illustrated in FIGURE 1 is eminently satisfactory for systems wherein the heat plastified thermoplastic resinous streams have flow viscosities at their extrusion temperatures within about the same order of magnitude. The resultant film or sheet is generally satisfactory for all but the most precise requirements. When an extremely uniform film is required, that is, one wherein the relative thickness of the layers is substantially constant across a major portion of the width. The spreader bar illustrated in FIGURES 4 and 5 is employed. A spreader bar such as the spreader bar 45 in cooperative combination with a housing such as the housing 27 tends to equalize the pressure drop alonga streamline extending from the die orifice such as the orifice 38 to the polymer inlet passageway 29. Similarly in cases where the cavity 31 has a small cross sectional area relative to its length a flow restrictor of nonuniform cross section is generally desirable. Inherently the apparatus of the present invention prepares a film or sheet on which the central layer does not extend to the outer edges thereof. However, this is an advantage rather than a disadvantage in that such edges are trimmed from the sheet or film and discarded as scrap. The configuration of the film or sheet as prepared in accordance with the present invention is particularly beneficial in that the portion trimmed away may comprise essentially material of the second stream only and thereby returned and utilized as feed stock for the second extruder either alone or in admixture with virgin polymer. The thermoplastic resinous compositions employed in the present invention may include dyes, pigments, stabilizers and similar well known additives. Frequently it is advantageous when initially adjusting a dye to employ a colored composition or a composition containing a small quantity of an opaque filler in the first stream, such as the stream supplied by the extruder 12. In this way the configuration of the inner layer is readily determined by the measurement of optical density. For most composite sheets and films visual observation of the extruded film is sufficiently accurate to provide a satisfactory product.

When utilizing a positionable bar such as the bar 35 of FIGURES 1 and 2, a thickness of the outer layers of the composite sheet are readily controlled by displacing the bar toward one or the other of the walls of the cavity 31. Such adjustment is readily accomplished by loosening the bolts holding the end plates 34 and positioning the spreader bar and end plates as a unit. Alternately, for more extreme variations the bar 35 is positioned relative to the plate 34 by loosening the appropriate bolts. If desired, more complicated bar adjusting apparatus may be employed if it is desired to position the bar 35 while the unit is in operation.

As is apparent from the foregoing specification, the apparatus of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. An apparatus for the preparation of a multilayer sheet comprising in cooperative combination a slot extrusion die having an internal passage adapted to receive concentric streams of heat plastified thermoplastic resinous material from an entrance passageway, a pair of spaced apart die lips so constructed and arranged so as to form an elongated extrusion orifice, the extrusion die defining a cavity therein having walls and ends, the walls being generally parallel to the orifice, the cavity providing communication with the internal passage and the extrusion orifice, an elongate flow restricting means disposed within the internal passage extended longitudinally within the passage in a direction of the extrusion slot and being spaced from the entrance passageway and the internal surface of the die defining the cavity between the entrance passageway and the slot, means to deliver a first stream of heat plastified thermoplastic resinous material to a first conduit, a means adapted to deliver a second stream of heat plastified thermoplastic resinous material to a second conduit, a first conduit and a second conduit, each of the conduits having first ends adapted to receive heat plastified thermoplastic resinous material from the first and second means to deliver, respectively, the first conduit and the second conduit having discharge ends generally concentrically arranged so as to deliver concentric streams of heat plastified thermoplastic resinous material to the entrance passageway.

2. The apparatus of claim 1 wherein the flow restrictor is a generally cylindrical bar disposed within the extrusion die and adjustably supported by a pair of end plates.

3. The apparatus of claim 1 wherein the flow restrictor is an elongated bar disposed within the internal passage and having a trailing edge and a leading edge, the leading edge being positioned adjacent the source of the concentric streams, the trailing edge being positioned generally adjacent the extrusion orifice, and restricting flow of material within the internal passageway to a greater degree in the center portion thereof than at the end portions thereof.

4. The apparatus of claim 1 wherein the means to provide the first and second heat plastified streams are first and second extruders, respectively.

References Cited

UNITED STATES PATENTS

| | | | |
|---|---|---|---|
| 1,245,898 | 11/1917 | Gates | 18—12 |
| 2,090,404 | 8/1937 | Parkhurst | 18—12 |
| 2,402,281 | 6/1946 | Green | 264—177 |
| 3,274,646 | 9/1966 | Krystof | 18—13 |
| 3,290,727 | 12/1966 | Patzetakis | 18—13 |

ROBERT F. WHITE, *Primary Examiner.*

G. AUVILLE, *Assistant Examiner.*